April 18, 1961 L. J. FICHTER 2,979,969
CHANGE SPEED GEARING
Filed Jan. 27, 1960 5 Sheets-Sheet 1
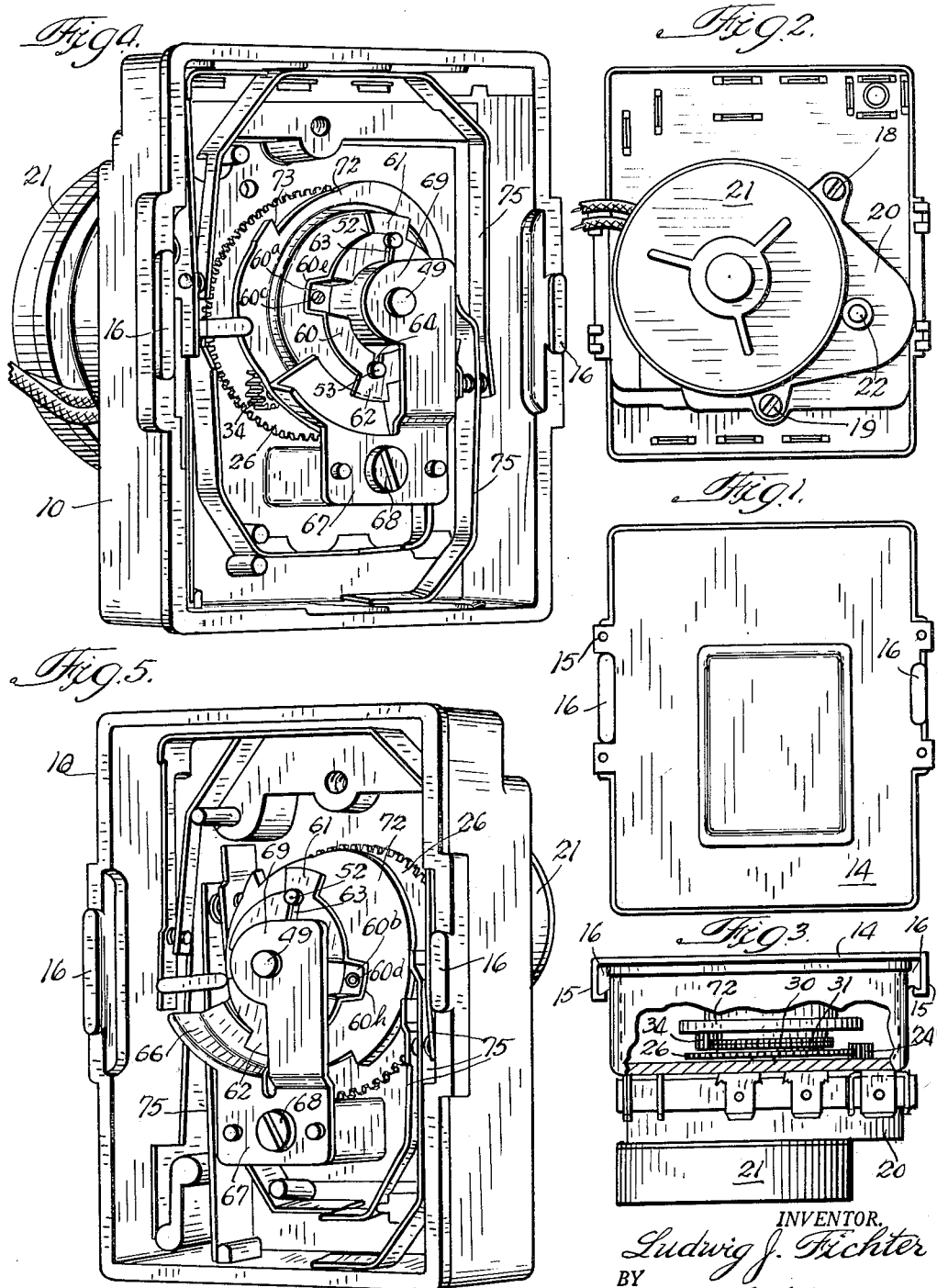
INVENTOR.
Ludwig J. Fichter
BY Robert L. Kahn
Atty.

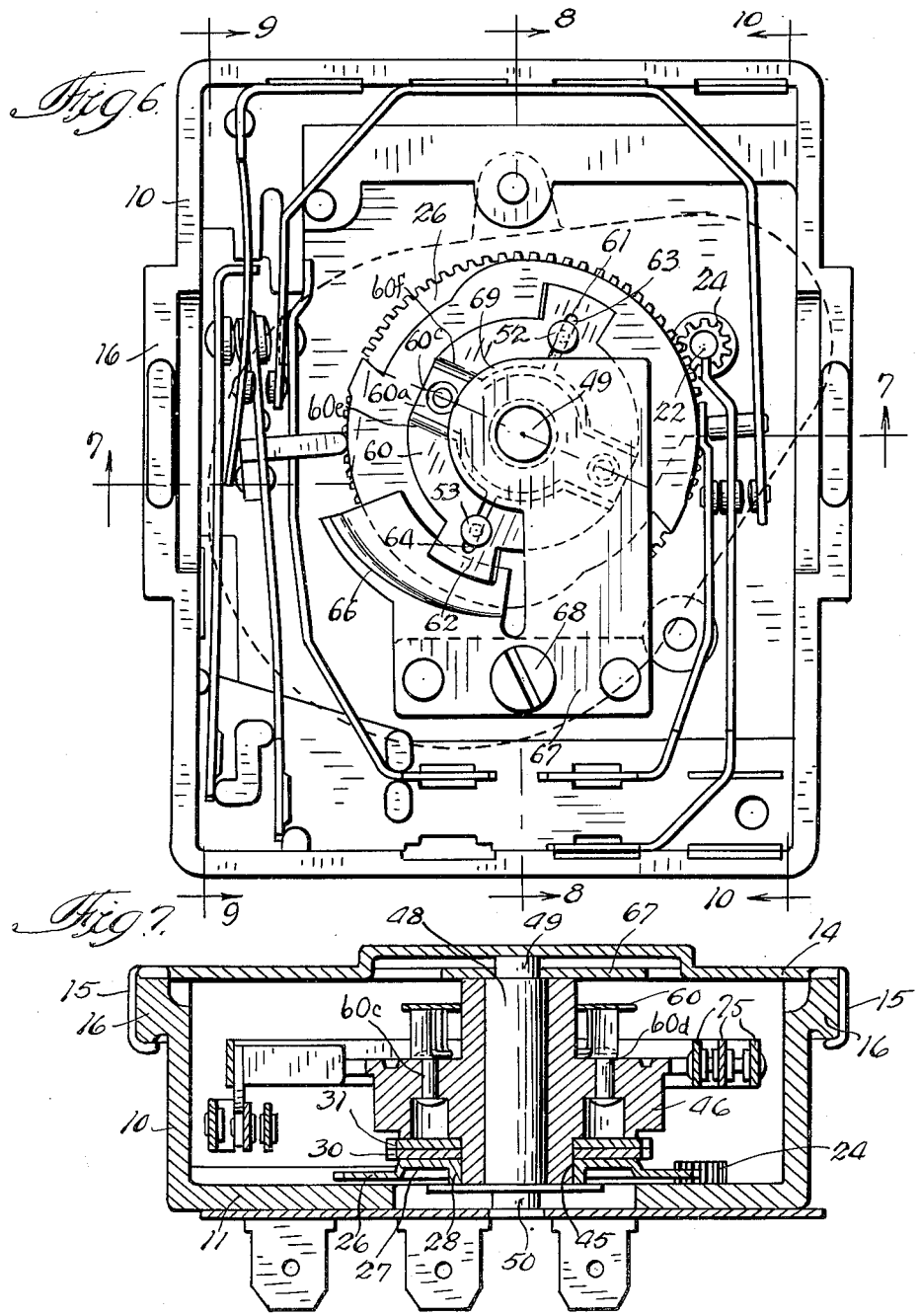

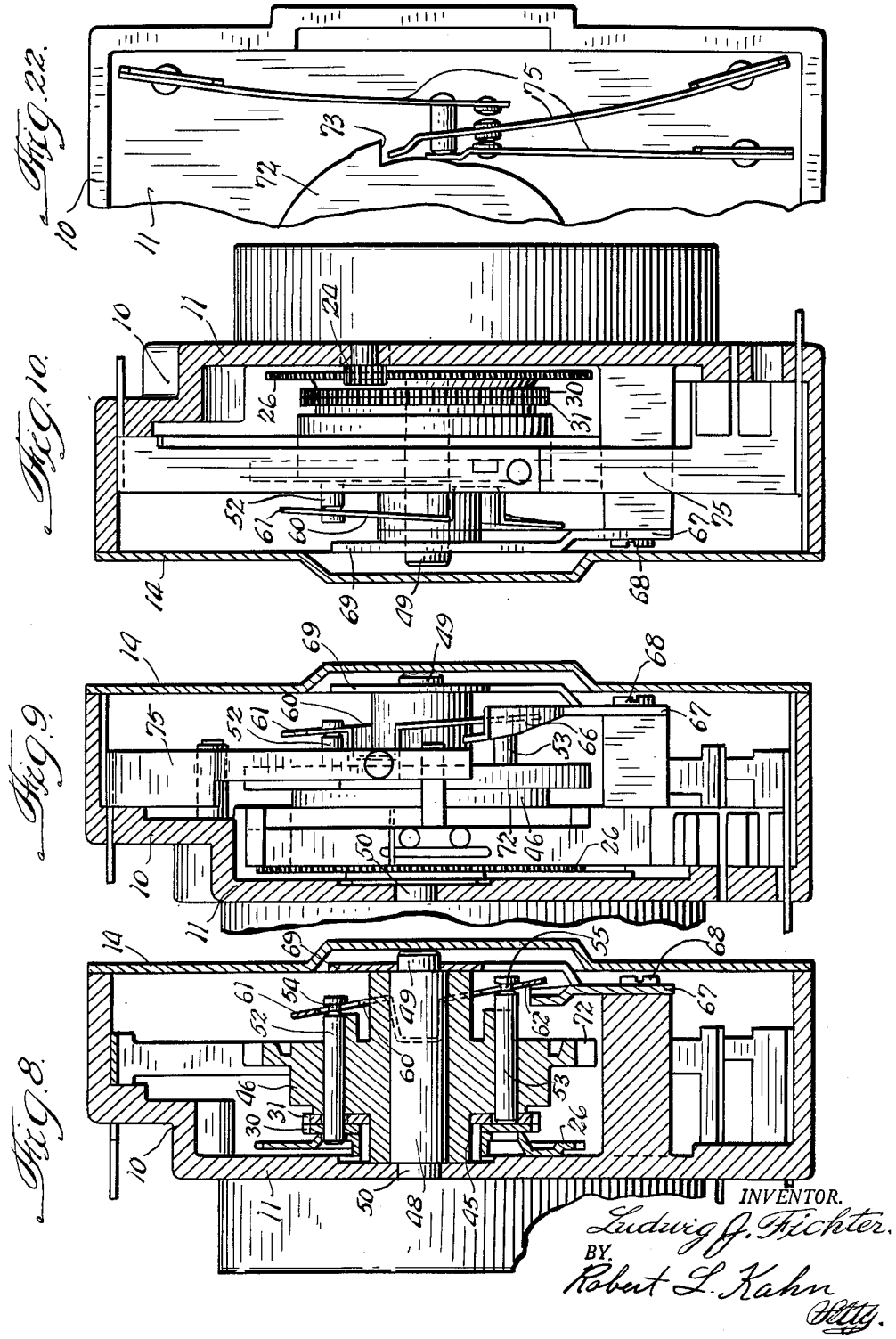

April 18, 1961 L. J. FICHTER 2,979,969
CHANGE SPEED GEARING
Filed Jan. 27, 1960 5 Sheets-Sheet 4
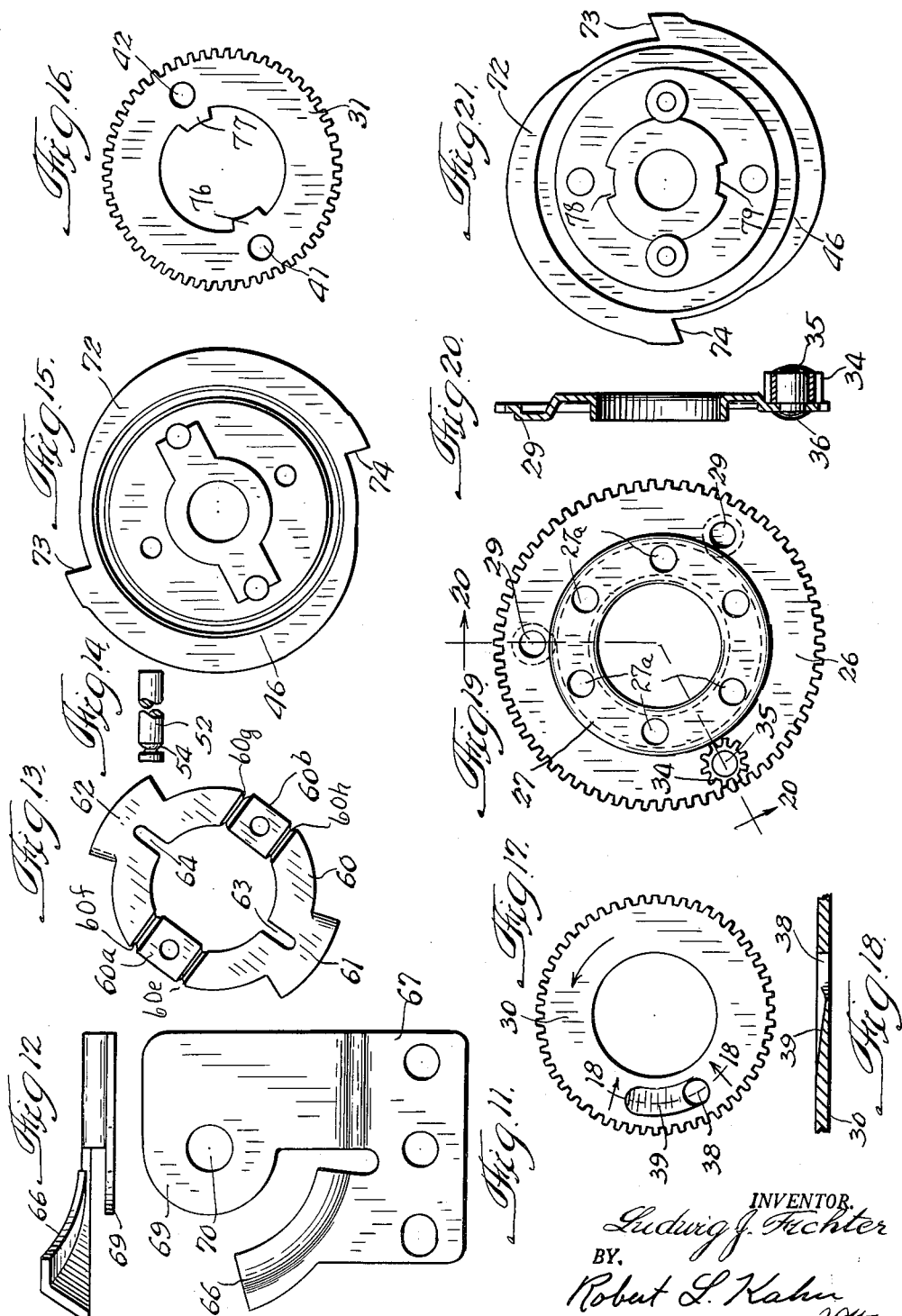
INVENTOR.
Ludwig J. Fichter
BY
Robert L. Kahn

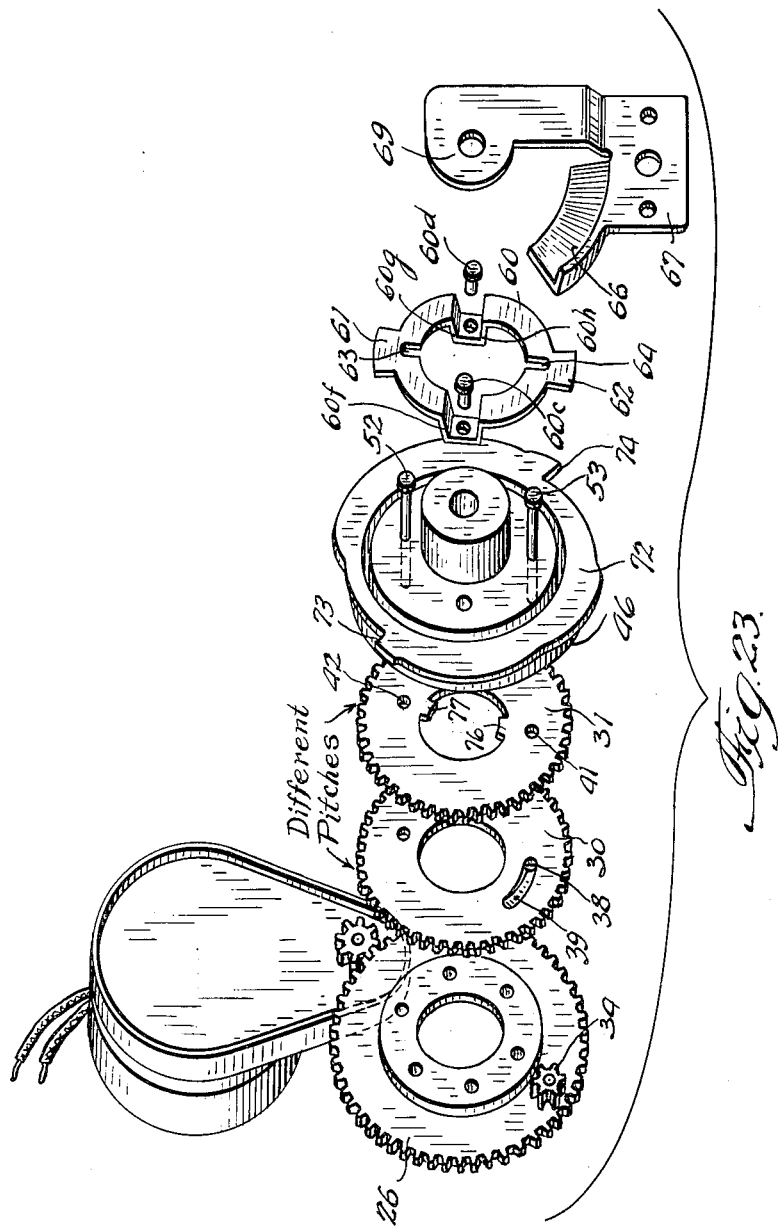

United States Patent Office 2,979,969
Patented Apr. 18, 1961

2,979,969

CHANGE SPEED GEARING

Ludwig J. Fichter, Chicago, Ill., assignor to Oak Manufacturing Co., a corporation of Delaware Filed Jan. 27, 1960, Ser. No. 5,045

8 Claims. (Cl. 74—750)

This invention relates to a timer of simple construction which can provide for relatively infrequent operation of one or more electric switches such as, for example, for use in a defroster for a household refrigerator. A timer for such purposes generally operates one or more electric switches to permit a refrigerator to defrost at periods ranging from once per day to longer time periods. The actual defrost time for a timer may generally be quite short, particularly when accelerated defrosting methods are used.

As examples, hot gases in a refrigerating system normally going to a condenser may be diverted for short periods of time to the evaporator or electric heating elements at the evaporator may be used. Sometimes a timer may be operated in conjunction with the refrigerator thermostat for controlling the reactivation of the refrigerating system after a defrost operation.

In any event, a timer used for such purposes preferably should have as many of the operating parts as possible, either stationary or moving very slowly during the long period between successive operations. During defrosting, however, electric switches must be operated and it is, therefore, desirable that members for operating the switches be moved at a relatively fast speed to insure desirable operation. In addition, the relatively fast operating speed of such operating members imposes far less demands on mechanical accuracy. Thus, a cam rotating once per 30 minutes or so is much simpler and easier to make and control than a cam of the same size rotating at a very much lower speed, say once every 24 hours.

This invention provides a simple and economical mechanism having parts which are normally movable at two different rates of speed depending upon what portion of the operating cycle is involved.

The invention generally contemplates a gear mechanism wherein a pair of super-imposed sun gears cooperate with a common planetary gear to create a differential movement between said two sun gears during slow movement. This is obtained by having one sun gear provided with a different number of teeth than the other sun gear, the difference being so small, say one tooth out of a total of 45 or more teeth, that a unitary planetary gear may cooperate with both sun gears. The planetary gear is supported on a drive gear and moved so that the center of the planetary gear moves in a circular path around the super-imposed sun gears. For fast movement, simple clutch means are provided for rotatably joining the two planetary gears to the drive gear whereby all move as a unit for obtaining fast movement to actuate switch operating members. Various other operating advantages will appear in connection with a detailed description of the invention. While the invention to be described has been indicated as being useful for defrosting timers, it is understood that it may be readily adapted for other devices having operating cycles.

Referring now to the drawings:

Figure 1 is a view of the new timer taken from what may be considered as the front of the housing.

Figure 2 is a rear view of the housing showing the timer motor housing.

Figure 3 is a view from the top of the housing as illustrated in Figure 2, said parts of the housing being broken away.

Figure 4 is a perspective view of the new mechanism disposed in the housing with the front wall of the housing removed.

Figure 5 is a view somewhat similar to Figure 4 but taken from a different angle.

Figure 6 is a view from the front of the mechanism showing the parts in a somewhat different position than is illustrated in Figures 4 and 5.

Figure 7 is a view along line 7—7 of Figure 6.

Figure 8 is a view along line 8—8 of Figure 6.

Figure 9 is a view along line 9—9 of Figure 6.

Figure 10 is a view along line 10—10 of Figure 6.

Figure 11 is a plan view of the clutch control cam plate.

Figure 12 is an edge view of the cam plate illustrated in Figure 11.

Figure 13 is a plan view of the clutch control cam follower plate for cooperation with the clutch control cam plate of Figure 11.

Figure 14 shows one of the clutch pins used in the mechanism.

Figures 15 and 21 show the switch control cam block from the front and rear, respectively.

Figure 16 is a plan view of the front sun gear.

Figure 17 is a plan view of the rear sun gear.

Figure 18 is a detail along line 18—18 of Figure 17.

Figure 19 is a plan view from the front of the drive gear and planetary gear.

Figure 20 is a section on line 20—20 of Figure 19.

Figure 22 is a detail of an electric switch operated by the switch cam.

Figure 23 is an exploded view of the sun gear drive and associated cam members.

Before proceeding with a detailed description of the construction, a general description of the new timer will be given. The timer requires an electric motor, this usually being a simple A.C. clock type of motor. As a rule, such motors operate at synchronous speed and have a power output shaft rotating at desired speeds ranging from one turn per minute to as much as one turn per 24 hours. The timing motor drives a drive gear upon which there is disposed in coaxial relation two sun gears. Meshing with the two sun gears is a planetary gear carried by the drive gear. The two sun gears have somewhat different pitches, although the difference is so small as to permit a single gear having one pitch to mesh with both sun gears. As the planetary gear is moved around the sun gears, a differential movement between the two sun gears results. Clutch means are provided to operate when the two sun gears reach a predetermined relative orientation to provide a direct driving connection between the drive gear and the two sun gears. Such a direct driving connection is maintained for a relatively short period of time and results in the two sun gears being turned with the driving gear at what might be considered a relatively rapid rate.

One of the sun gears is connected to suitable cam control means for operating electric switches, said cam control means also serving to automatically de-couple the sun gears from the driving gear after a predetermined sequence of operations. The mechanism then reverts to the condition where the two sun gears are connected to each other only through the planetary gear.

One of the sun gears is permanently connected to the cam operating means and switch operating mechanism and this one sun gear is maintained in fixed position while the planetary gear travels around it, the load being great enough so that a true differential action between the two sun gears is provided with all of the slow rotational effort being directed toward said other sun gear.

Referring now to the drawings, the new timer is disposed in housing 10 having rear wall 11. Housing 10 may conveniently be made of a molded plastic material, such as Bakelite for example. Such a plastic material has sufficient strength and the electrical resistance is high enough so that power contacts may be disposed in the housing during the molding process. The front of the housing is open and is covered by metal plate 14 having bent fingers 15 engaging bosses 16 in the housing walls. Mounted upon the outside of rear wall 11 of the housing, as by bolts 18 and 19 engaging tapped recesses in wall 11 is motor plate 20 carrying timing motor 21 having drive shaft 22. Timing motor 21 may be any one of a number of synchronous timing motors available on the market. Such timing motors have an output drive shaft which may be offset for the motor proper, as illustrated in Figure 2 for example, or which may be coaxial with the motor. The exact details of the timing motor are unimportant.

Drive shaft 22 runs in suitable bearing which may be carried by motor mounting plate 20 or which may be carried by wall 11 of the housing. Drive shaft 22 carries drive pinion 24.

Meshing with pinion 24 is drive gear 26 having forwardly offset hub portion 27 whose inner edge is shaped to provide axial flange 28. Drive gear portion 26 is provided with embossings 29 which provide a plurality of discrete bearing regions upon which the drive gear may be supported with minimum friction on some smooth surface such as the inside surface of wall 11 of the housing.

Resting upon hub portion 27 of the drive gear is first sun gear 30 and superimposed upon sun gear 30 is second sun gear 31. Sun gears 30 and 31 are conveniently of the same size but differ slightly in pitch. One of the two sun gears has one or more teeth than the other, the difference in the two gears depending upon design considerations. Normally sun gears 30 and 31 are coupled by planetary gear 34 carried by pin 35 on drive gear 26. Pin 35 has head 36 thereof rounded to simulate embossings 29. Planetary gear 34 is thick enough so that it can mesh simultaneously with the teeth of sun gears 30 and 31. The difference in pitch between the two sun gears is normally small enough so that one planetary gear will suffice.

Sun gear 30 is provided with apertures 38 for accommodating a coupling pin arrangement, to be described. Aperture 38 has sloping cam portion 39 extending from the trailing half of the aperture with reference to the normal direction of travel of sun gear 30. The cam surface is obtained by shaping the metal of gear 30 so that the thickness varies from a minimum adjacent the trailing edge of aperture 38 to the full thickness of the gear stock somewhat to the rear of the aperture. The slope of the cam surface should be sufficient to insure a smooth operation of the pin mechanism to be described. It should be noted that cam slope 39 extends downwardly from the front face of sun gear 30 toward aperture 38.

Sun gear 31, shown in Figure 16, is provided with two apertures 41 and 42 at diametrically disposed points. The diameter of each of apertures 41 and 42 is substantially equal to that of aperture 38 in gear 30, and the radial distance from the center of the gear to each aperture is the same. Thus, aperture 38 and gear 30 can register with aperture 41 or 42 in certain relative gear positions.

Drive gear 26 and sun gears 30 and 31 are all designed to be centered with respect to reduced hub portion 45 of rotary switch operating cam block 46. Rotary cam block 46 is preferably of molded material, such as Bakelite, and is supported for rotation on stationary pin 48 having reduced ends 49 and 50. Portion 50 of the pin is disposed in a suitable recess in the housing while reduced portion 49 is supported by a metal plate to be described later.

Cam block 46 has two passages lateraly offset from the center of pin 48 and disposed on opposite sides of the axis, these passages extending parallel to the pin axis and accommodating plunger pins 52 and 53 (see Figures 8 and 23). Plunger pins 52 and 53 are similar and have necks 54 and 55 adjacent the front or head ends of the pin. Pins 52 and 53 are sufficiently long so that, as illustrated in Figure 8, the body of each pin permits the head to extend on at the front side of cam block 46 and permits the other or clutch end of the pin, assuming the parts are in proper position, to extend through aligned apertures in sun gears 31, 30 and hub portion 27 of the drive gear. Hub portion 27 of the drive gear is provided with a number of apertures 27a of the same size as apertures 38, 41 and 42 in the sun gears and located at the same radial distance from the axis of the gears.

Pins 52 and 53 are coupled to spring member 60 (see Figure 13) having slotted wing portions 61 and 62 disposed opposite to each other. Member 60 can accommodate necks 54 and 55 of the pins in slots 63 and 64 of the wings so that the pins are locked to the wings for longitudinal movement of the pins.

Member 60 has apertured mounting portions 60a and 60b by which it may be rigidly attached to cam block 46 with rivets 60c and 60d extending through longitudinal passages in the cam block. Mounting portions 60a and 60b are connected to wing portions 61 and 62 by bent spring portions 60e to 60h inclusive. Member 60 is of spring metal so that wings 61 and 62 can rock independently of each other.

Wings 61 and 62 function as cam followers and for this purpose cooperate with curved ramp cam 66 (see Figures 11 and 12) carried by bearing plate 67 rigidly bolted at 68 to an interior wall within housing 10. Plate 67 has portion 69 apertured at 70 for accommodating reduced end 49 of stationary pin 48. It is clear that if either of wings 61 or 62 engages ramp 66, assuming the direction of rotation is correct, then the active wing will be elevated from a normal position (see Figure 8) and the corresponding pin, in this case pin 53, will ride high enough to clear the drive gear and sun gear 30.

It may be observed at this point and with reference to Figure 8, the drive gear and the two sun gears are coupled together by pin 52 so that switch operating cam block 46 will rotate directly with drive gear 26. When the cam block turns enough so that wing 61, for example, associated with pin 52, starts to rise on ramp 66, pin 53 (which would be where pin 52 is shown in Figure 8) cannot drop to the drive gear for the reason that sun gear 30 only has one aperture 38. It is clear, therefore, that only one pin of pins 52 and 53 can be active for coupling the drive gear and sun gears together. Sloping ramp 39 of sun gear 30 makes it easier for the sun gear to begin to move away from the pin which had been projecting through aperture 38.

It may also be noted that sun gear 31 is normally prevented from turning when the two sun gears are not directly coupled to each other by a pin because of the friction of the various parts representing the load on cam disk 46. It is thus possible for a pin such as 53 in Figure 8 to function as a permanent coupling between sun gear 31 and cam block 46, leaving sun gear 30 to respond to the differential turning force.

The direct turning movement of cam block 46 is utilized for controlling electric switches. To this end, cam block 46 has switch operating cam portion 72 having drops 73 and 74. Electrical contacts carried by spring arms 75 and anchored in the housing cooperate with cam portion 72 to effect a desired sequence of switch operations. Inasmuch as the arrangement of switch arms and the sequence of switch operations may be varied, no detailed description of the contacts and switch arms need be given. It is clear that cam portion 72 carried by the cam block may have any desired shape and may be used in any desired manner for effecting any desired switch operation.

A brief description of the operation of the device will now be given. Assuming that timing motor 21 is operating and assuming that the mechanism is in a condition where both pins 52 and 53 are out, then drive gear 26 will rotate and will move planetary gear 34 around the superimposed sun gears. As previously pointed out, pins 52 and 53 will couple cam block 46 to sun gear 31, the sun gear having apertures 41 and 42 for this purpose. The sun gear 31 is also coupled by two keys 76 and 77 (Fig. 16) engaging key ways 78 and 79 (Fig. 21). In this condition, sun gear 30 will have its single aperture 38 out of registry with either of apertures 41 or 42 of sun gear 31. Accordingly, sun gear 30 will be rotated in this particular instance in a counterclockwise direction as seen in Figure 17. Because of the slope of ramp 39, it is preferred to have drive gear 26 and sun gear 30 turn in the same directions at all times. Due to the differential action, sun gear 30 will slowly turn until its aperture 38 registers with aperture 41 or 42 of sun gear 31. Because of the small difference in pitch between the two sun gears, the backlash between the planetary gear and the sun gears and loose fit of coupling pin 52 (or 53) in aperture 38 of sun gear 30 and the large number of coupling holes in hub portion 27 of the drive gear, the mechanism will soon reach a position where a pin passing through both of the sun gears will also pass through an aperture in the hub of the drive gear. When this occurs, cam block 46 is turned with the drive gear through one half a revolution. The active pin, coupling the drive gear and the sun gears will thereupon encounter ramp 66 and be pulled to an inactive uncoupled position. During this turning of the cam block, the cam portion of the cam block operates switches in desired sequences. When the active coupling pin is uncoupled, ramp 39 of sun gear 30 permits the two sun gears to rotate relative to each other. The loose fit of a coupling pin in aperture 38 and the tolerances in the various gears of the differential permit a pin to be uncoupled smoothly and prevents binding when the active pin has passed through the aperture in rear sun gear 30 but before reaching an aperture in the hub of drive gear 26.

What is claimed is:

1. A timer comprising a housing, a driving gear mounted for rotation in said housing and adapted to be driven by a timing motor, a planet gear carried by said driving gear near the edge of the driving gear with the two gear axes being laterally offset from and parallel to each other, a pair of sun gears coaxial with said driving gear at one side thereof, one sun gear being disposed between said driving gear and the other sun gear, said two sun gears meshing with said planet gear and being otherwise uncoupled, the two sun gears having their respective pitches somewhat different so that as the planet gear rotates around the sun gears, some relative rotation occurs between the two sun gears, a load to be controlled by said timer, said load including a member rotatively coupled to said other sun gear, said load providing sufficient friction so that said other sun gear remains substantially stationary with most of the relative movement between the two sun gears occurring in the one sun gear, means operative at a predetermined oriented position of said one sun gear with respect to the other sun gear for directly coupling said driving gear and two sun gears to rotate as a unit through a predetermined angle, means responsive to the rotation of said other sun gear through said predetermined angle for uncoupling the one sun gear from the drive gear and from the other sun gear to restore the drive gear and two sun gears to their normal uncoupled relationship, and means responsive to said member for actuating said load.

2. A timer comprising a housing, a driving gear mounted for rotation in said housing and adapted to be driven by a timing motor, a planet gear carried by said driving gear near the edge of the driving gear with the two gear axes laterally offset from and parallel to each other, a pair of sun gears coaxial with said driving gear at one side thereof, one sun gear being disposed between said driving gear and the other sun gear, said two sun gears meshing with said planet gear and being otherwise normally uncoupled, the two sun gears having somewhat different pitches so that, as the planet gear rotates around the sun gears, some relative rotation occurs between the two sun gears, a load to be controlled by said timer, said load including a member having two coupling pins laterally offset from, but parallel to, the coincident axes of the driving and sun gears, said coupling pins being diametrically disposed opposite each other and being longitudinally movable, said other sun gear having apertures therethrough for accommodating said coupling pins to permit the same to pass through the other sun gear and rotatably couple said member to said other sun gear, said load providing sufficient friction so that said other sun gear is stationary with the relative movement between the two sun gears occurring in the one sun gear, said one sun gear having one opening therethrough for accommodating a coupling pin when said one sun gear is properly oriented with respect to the other sun gear, said driving gear having a plurality of coupling apertures for accommodating a coupling pin so that a coupling pin can pass through the two sun gears and driving gear to provide a direct pin coupling between the three, spring means urging said coupling pins to move longitudinally into a coupling position, cam means responsive to the rotation of said member through a predetermined angle for moving the active coupling pin to a disengaged position and thus restore the sun gears and drive gear to their normal relationship and means responsive to the rotation of said member for actuating said load.

3. The construction according to claim 2 wherein said one sun gear at the region of the one coupling opening has the gear stock tapered to provide a cam action for raising the pin to an uncoupling position as said one sun gear begins to move away from the oriented position.

4. The construction according to claim 2 wherein said cam means responsive to the rotation of said member includes a cam rigidly supported to be stationary and wherein said member includes a cam follower for cooperating with said cam.

5. A timer comprising a housing, a driving gear adapted to be driven by a timing motor, a planet pinion gear carried by said driving gear near the edge thereof with the two gear axes being laterally offset from and parallel to each other, said planet gear being rotatable about its axis, a pair of sun gears coaxial with said driving gear disposed against the drive gear, the two sun gears meshing with the planet gear, said two sun gears having somewhat different pitches so that, as the drive gear rotates and moves the planet gear around the two sun gears, some relative rotation between the two sun gears will result, a cam block in coaxial relation to said drive and sun gears, said cam block having a pair of longitudinal passages therethrough parallel to the axis of the cam block and symmetrically disposed with respect thereto, said cam block being mounted so that one end portion thereof is adjacent the free outer face of the outer sun gear, said passages terminating at the face of the outer sun gear, a coupling pin for each cam block passageway, said coupling pins being longitudinally movable in said passageway and being long enough to extend beyond the cam block, said outer sun gear having two apertures therethrough for registering with the coupling pins, said two coupling pins normally extending through said outer sun gear to couple the cam block and outer sun gear for rotation, said inner sun gear having one coupling aperture therethrough for cooperation with a coupling pin when said two sun gears are in properly oriented position, said driving gear having a series of coupling apertures therethrough, any one of which can register with a coupling pin so that when properly oriented, one coupling pin only can pass through both sun gears and driving gear to provide a direct pin coupling, said cam block normally providing sufficient friction to prevent the outer sun gear from rotating due to the operation of the planet gear so that all of the relative movement between the two sun gears occurs at the inner sun gear, spring means carried by said cam block and engaging the coupling pins for urging said coupling pins toward the sun and drive gears, neither of said coupling pins being active when the two sun gears are not oriented for coupling engagement, the clearances and backlash, however, permitting only one pin to pass through the inner sun gear and the driving gear upon proper orientation of the two sun gears and driving gear, said driving gear and two sun gears thereupon turning together as one unit, a stationary cam supported in proximity to said cam block, said spring means for operating on said coupling pin including a cam follower, said stationary cam having an angular extent of about one-half a turn of the cam block, said stationary cam cooperating with a cam follower to move an active coupling pin into a disengaging position after said cam block has turned through an appropriate angle.

6. The construction according to claim 5 wherein said inner sun gear has the trailing edge of its coupling aperture provided with a cam surface for helping move an active coupling pin to an inactive uncoupling position.

7. The construction according to claim 5 wherein said cam block has a portion projecting through the sun and drive gears for maintaining the same in coaxial relation.

8. The construction according to claim 5 wherein said cam block has a shoulder portion extending through the sun and drive gears, said gears being rotatably supported and maintained in alignment by said cam block shoulder, a stationary support for the other end of said cam block, said stationary support including as a part thereof a circular cam for cooperation with the coupling pin actuating means.

No references cited.